(No Model.)
2 Sheets—Sheet 1.

J. C. POWERS.
MACHINE FOR SEPARATING COTTON SEED.

No. 248,788. Patented Oct. 25, 1881.

Attest.
Charles Pickles
Ralph Talbot.

Inventor.
John C. Powers
By H. J. Ennis
Atty (No Model.)
2 Sheets—Sheet 2.

J. C. POWERS.
MACHINE FOR SEPARATING COTTON SEED.

No. 248,788.  Patented Oct. 25, 1881.

Attest:
Charles Pickles
Ralph Talbot

Inventor:
John C. Powers
H. J. Ennis
Atty.

UNITED STATES PATENT OFFICE.

JOHN C. POWERS, OF ST. LOUIS, MISSOURI.

MACHINE FOR SEPARATING COTTON-SEED.

SPECIFICATION forming part of Letters Patent No. 248,788, dated October 25, 1881.

Application filed December 20, 1880. (No model.)

*To all whom it may concern:*

Be it known that I, JOHN C. POWERS, a citizen of the United States, residing at the city of St. Louis, State of Missouri, have invented certain new and useful Improvements in Machines for Separating Cotton-Seed, of which the following is a specification.

My improvement relates to cotton-seed separators such as are used after the seed has passed through the hulling-machine.

The object of my invention is to thoroughly separate the kernel of the seed from the hull and light fluffy material that adheres to the hull before passing to the grinding-machine, and thus preventing any speck from being found in the final product.

Figure 1:
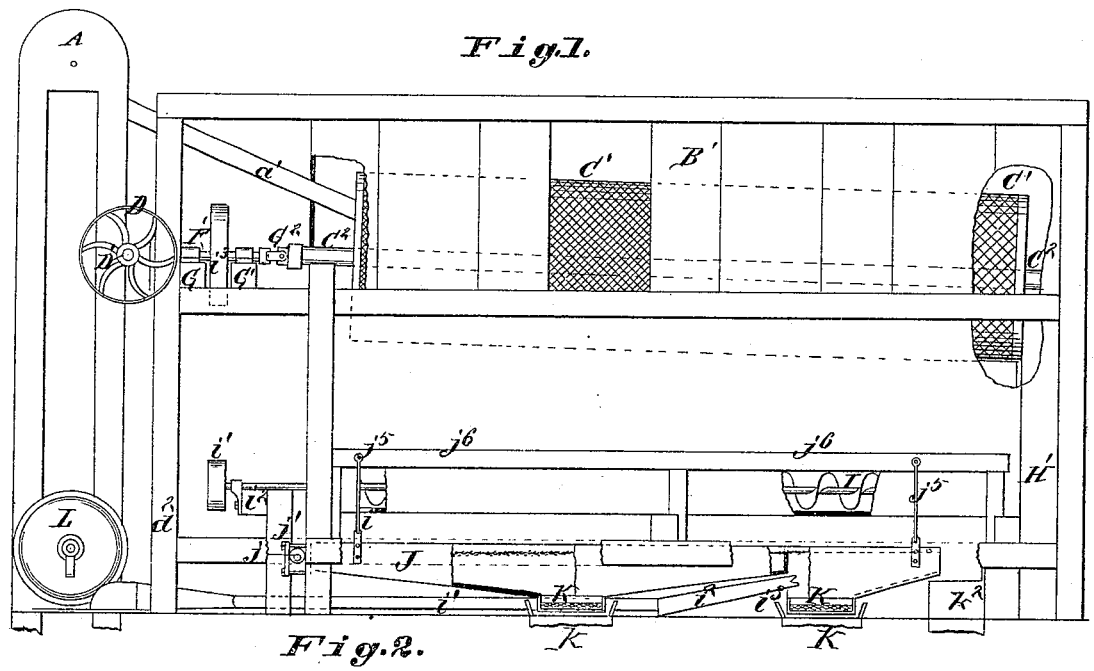
Figure 2:
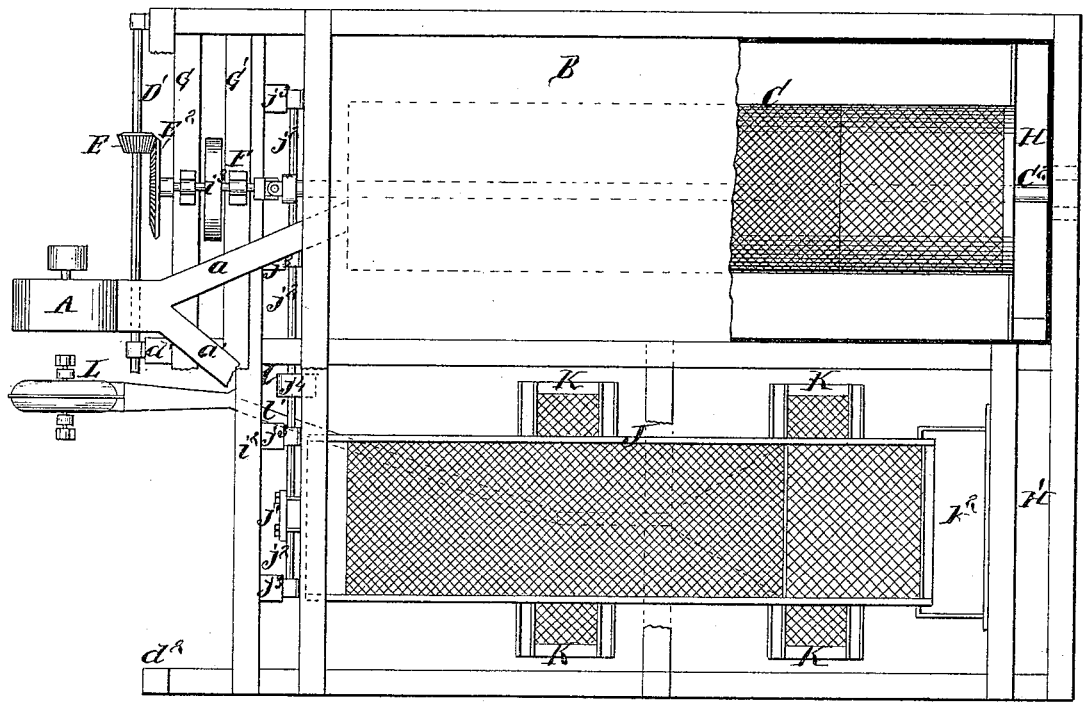
Figure 3:
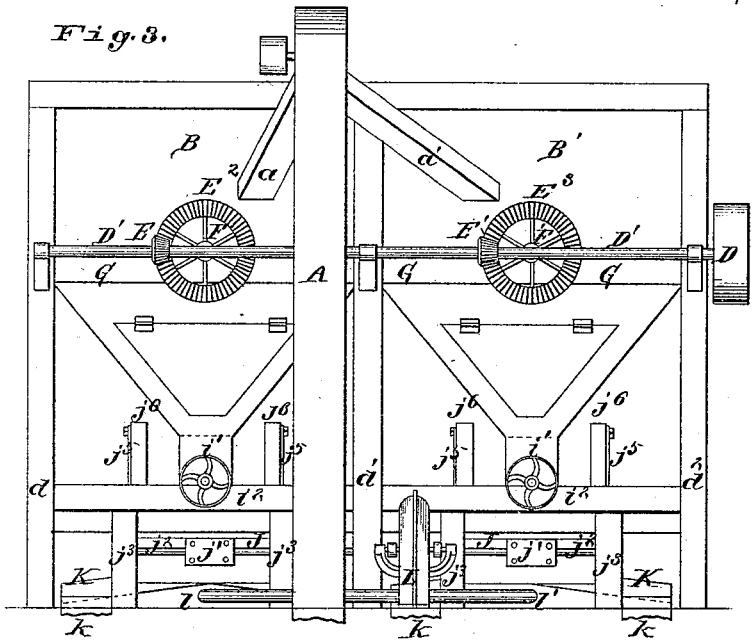
Figure 4:
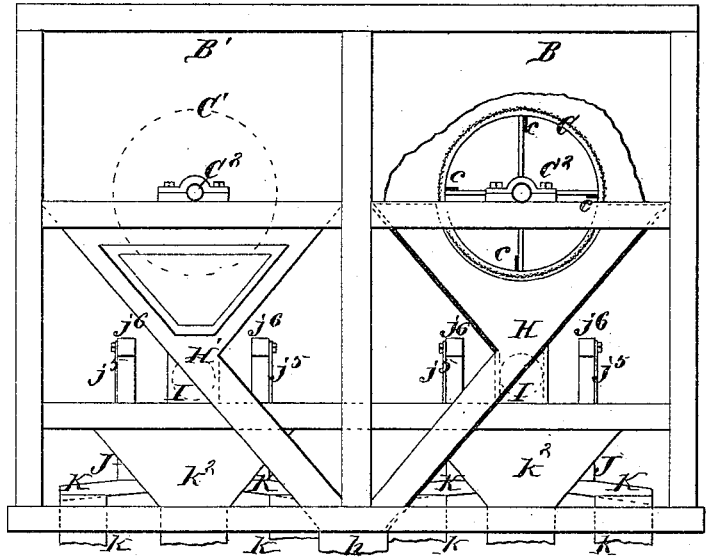
Figure 5:
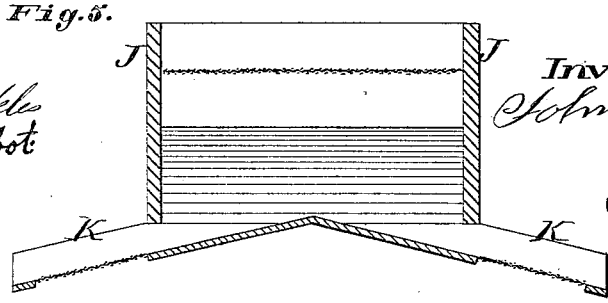

Reference being had to the accompanying drawings, Figure 1 is a side elevation with parts broken away; Fig. 2, the top plan of the machine, with one of the bolting-chests removed to show the top of the separating-shaker; Figs. 3 and 4, front and rear end elevations; Fig. 5, cross-section of the shaker through two of the discharge-spouts.

Similar letters refer to similar parts throughout the several views.

A is the elevator, of any suitable construction, having branch spouts $a'$ $a$ leading into the bolting-chests B B', and depositing the material upon the inside of the bolting-reels C C'.

$c$ $c$ $c$ $c$ are strips extending lengthwise upon the interior of the reel, to which the clothing of the reel is secured, said strips being secured to suitable spiders on the shaft $C^2$.

The bolting-reels are driven by means of the pulley D on the shaft D', having bearing in the standards $d$ $d'$ $d^2$. Upon this shaft are the pinions E E', meshing into the wheels $E^2$ $E^3$ on counter-shafts F F', which have bearing on the cross-timbers G G', and provided with suitable coupling, $G^2$, to the reel-shaft $C^2$.

At the rear end of the bolting-chests are two inclined chests, H H', into which the product from the tails of the reels is deposited, and thence into the chute $h$ at the lower end, to be conveyed away. In the bottom of said bolting-chest is a spiral conveyer, I. Extending the full length of the chest $i$ is an opening in the bottom of the conveyer-box for the discharge of the material upon the oscillating shaker J. The conveyer is driven by means of the pulley $i'$ upon the conveyer-shaft, having bearing upon the cross-timbers $i^2$, power being imparted to the pulley by means of a belt from the pulley $i^3$ upon the shaft F, each bolting-chest being provided with a conveyer and suitable driving mechanism.

The shakers J are operated by means of a cam, $j$, working in a yoke, $j'$, attached to the shaker. This cam is secured to the shaft $j^2$, having bearing against the standards $j^3$, and driven by means of the pulley $j^4$, the shaker being held in suspension by means of the rods $j^5$, the upper end of said rods being allowed to oscillate upon bolts passing through eyes in said rods, said bolts being secured in the standards $j^6$ and the lower end loosely connected to the shaker.

The shaker J is provided with four discharge-spouts, K, two on each side. The bottom of the shaker is so constructed as to incline each way toward the discharge-spouts K, and the bottom of the discharge K to incline downward for a free delivery of the screenings. The top of the shaker is provided with two or more grades of wire-cloth, the finest at the head and the coarsest at the tail, the discharge-spouts being partially clothed with a coarser grade of wire-cloth. Beneath the spouts K are suitable spouts, $k$. At the rear end of the shakers are the down spouts $k'$ $k^2$, into which passes the product from over the tail of the shakers.

L is a fan situated at the forward end of the machine, or at any convenient position, and having branch pipes $l$ $l'$ leading therefrom to flared nozzles $l^2$, entering the bottom of the shaker at the point $l^3$ and ranging upward.

The operation of my machine is as follows: The material, being fed into the bolts by means of the conveyer A and branch spouts $a$ $a'$, is deposited upon the clothing of the reel, which is clothed with wire-cloth of increasing coarseness toward the tail, and as the reel revolves the material is caught by the strips $c$ and carried up and dropped again, thus thoroughly separating the stuff, and the reel being at an incline the material travels toward the tail, the kernel passing through the meshes of the cloth with some of the fine hull and fluffy material, and the balance over the tail of the reel to the spouts H H', and thence conveyed away. Such particles as pass through the reel are deposited in the conveyer-box and carried to the forward end of the bolting-chest and deposited upon the shaker through the opening $i$, and by the movement of the shaker back and forth, the screen of which being upon an incline, the material is carried toward the tail, the kernels passing through the meshes, and the hulls and fluffy material passing over the tail $k'$ or $k^2$, and thence carried away. Such material as has passed through the meshes of the shaker-screen are conveyed by means of the inclined bottom to the spouts K, where the material is again subjected to the screening operation, the hull and fluffy material passing over the end, while the kernel (the result of the whole operation of screening) passes through the meshes of the cloth into the spouts K, thence to any suitable receptacle.

The use of the fan is to particularly separate the lighter particles from the heavier, and by providing a division in the shaker immediately over the nozzle the blast of air will all be discharged through the meshes of the cloth toward the tail of the shaker, thus securing a complete separation.

To prevent the kernel that has not gone through the meshes of the cloth from passing over the end of the shaker, I provide a small strip across the shaker near the end of sufficient height to prevent the kernel rolling over.

What I claim is—

1. In a cotton-seed separator, the combination of the conveyer A, provided with spouts $a$ $a'$, bolting-chests B B', having the inwardly-inclining discharge-pipes H H', terminating in the chute $h$, reels C C', shaft $C^2$, strips $c$ $c$, secured to the same, and the conveyers I I, substantially as shown and set forth.

2. In a cotton-seed separator, the combination of the conveyer A, provided with branch pipes $a$ $a'$, bolting-chests B B', having spouts H H', reels C C', and shafts F F' $G^2$ $C^2$, with the conveyers I I, the pulleys $i'$, the shakers J J, having discharge-spouts K, fan L, having branch pipe $l$ $l'$, and flaring nozzles, all combined and operating as set forth.

JOHN C. POWERS.

Witnesses:
CHARLES PICKLES,
JNO. O'LEARY.